INVENTOR.
Burton L. Siegal.
By Norton Leiser
Attorney.

April 23, 1968   B. L. SIEGAL   3,379,229
PORTABLE SAW TABLES

Filed Nov. 9, 1965   2 Sheets-Sheet 2

INVENTOR.
Burton L. Siegal.

By Norton Lesser
Attorney

United States Patent Office 3,379,229
Patented Apr. 23, 1968

3,379,229
PORTABLE SAW TABLES
Burton L. Siegal, Skokie, Ill., assignor, by mesne assignments, to Porta-Table Corporation, a corporation of Illinois
Filed Nov. 9, 1965, Ser. No. 506,994
5 Claims. (Cl. 143—132)

ABSTRACT OF THE DISCLOSURE

A work table for supporting cutting means and construction material in a predetermined relationship so that said construction material may be cut or mitered at a desired angle. The table having a plurality of miter pin assemblies associated with the upper working surface thereof, each of said assemblies including a spring biased plunger and selectively operable means for retaining said plunger in a first position with a portion thereof extending above the working surface of the table to be engaged by a construction material, or in a second position wherein said plunger is retracted below said work surface.

---

This invention relates in general to portable saw carrying tables of the type disclosed in copending application Ser. No. 506,963, filed by George A. Carlberg and Burton L. Siegal simultaneously herewith, and more particularly to arrangements for rendering said tables more economical, rugged and versatile.

Briefly, one object of the present invention is to provide an economical, rigid portable table for supporting a construction material such as lumber or siding to be cut, and to also support and guide a portable saw with said table formed of a lightweight body for ease of transport.

Another object of the present invention is to provide an accurate economical arrangement for enabling a portable saw to perform miter cuts and function in a manner comparable to a radial saw.

Still other objects of the present invention are to extend the versatility of a portable saw to a construction site and to permit portable saws of different dimension to be used on the same portable table.

Other objects and features of this invention will become apparent on examination of the following specification, claims and drawings; wherein:

Figures 1, 2:
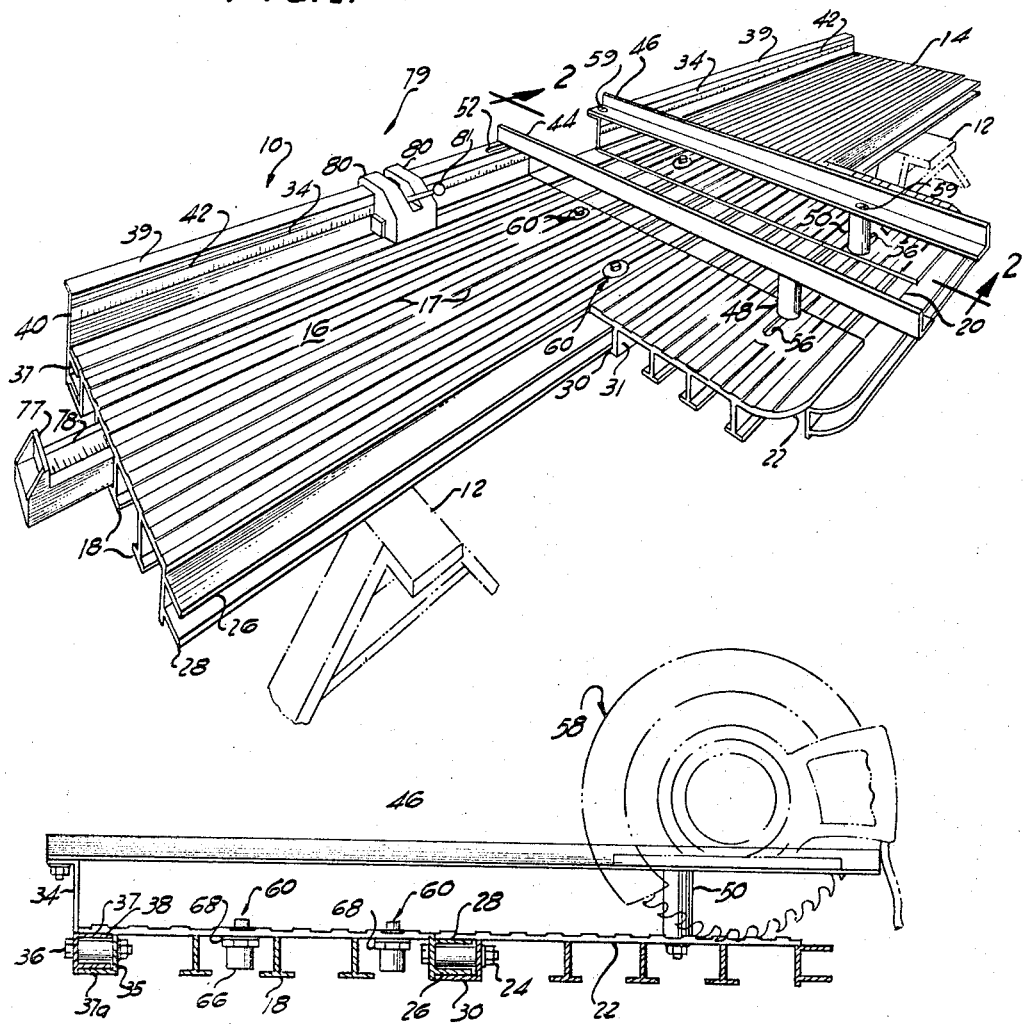
FIG. 1 is a perspective view of the table incorporating principles of the present invention.
FIG. 2 is a sectional view taken generally along the line 2—2 in FIG. 1 illustrating a portable saw in position on the table.

In FIG. 1 of the drawings a portable table is indicated by the reference character 10. The table 10 is shown carried on a pair of horses 12 illustrated by the broken lines. Any convenient support structure at a construction site may, of course, be used in place of the horses.

Table 10 comprises a simple elongate aluminum top section 14 approximately 108″ in overall length and 19½″ wide with an upper planar surface 16 on which a board or 2 x 4 or siding may be cut, as explained in the aforementioned application. A plurality of depending T-shaped ribs 18 are formed integrally beneath top section 14. The upper planar surface 16 has a plurality of fine ribs or ridges 17 thereon to facilitate sliding of the piece to be cut. A recess or cutout portion 20 of approximately 3″ wide is provided in top section 14 intermediate the ends thereof with one edge of the recess located approximately 24″ from the right end of section 14. The ribs 18 extend across the opening or cutout 20 to maintain the top section as a unitary rigid construction while providing convenient structure for fastening apparatus to the table. The bottom surface of the ribs 18 provide a planar surface upon which the table 10 is conveniently supported in a horizontal position.

An extension or apron 22 of similar construction to table 10 but shorter, is attached to one edge of top section 14. Apron 22 is attached to section 14 intermediate the ends thereof by means of conventional bolts 24 received between a pair of extruded horizontal edge rails 26 and 28 on wall 14. The top edge rail 28 is slightly recessed below surface 16 to permit overlapping engagement between the top wall of apron 22 and the top edge rail 28 so that the top surface of apron 22 is flush with surface 16. The bottom edge rail 26 is nestingly received by a bottom rail 30 formed on an end rib 31 of the apron and through which bolts 24 pass to form a rigid structure when tightened by nuts. A cutout portion in the apron similar to portion 20 is aligned with cutout portion 20.

The table 10 is also provided with elongate upwardly projecting fences 32 and 34 along the edge of the table opposite apron 22 and fastened to an end rib 35 of the table by means such as bolts and nuts 36. The fences each have rails 37 which nestingly engage a similar rail 37 and 38 on wall 14 to form a rigid connection. The fences permit a stud to be firmly held for a perpendicular cut. A horizontal leg 39 is provided at the top of each fence 32 and 34. An elongate recess 40 in each fence receives a respective tape 42 having scales whose indications increase in opposite directions from the cutout portion 20.

A pair of spaced L-shaped guide rails 44 and 46 are carried by the table 10 above the planar surface 16 adjacent opposite edges of the cutout portion 20. One end of each guide rail is fastened on the horizontal leg 39 on opposite sides of cutout portions 20. The other end of each rail is supported on a respective standard 48 and 50. The standards 48 and 50 are adjustably supported on apron 22 on opposite sides of cutout portion 20. Slots 52 in the respective legs 39 and respective slots 56 on the apron permit the rails 44 and 46 to be adjusted relative to each other along the elongate axis of the table for accommodating; the sole plate of a portable power saw 58 such as indicated by broken lines in FIGS. 2 and 3. Flathead screws 59, which do not project above the surface of rails 44 and 46 serve to fasten the rails in a desired position.

Figure 4:
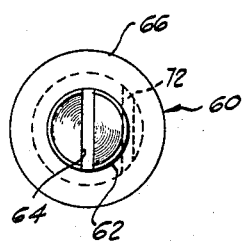
FIG. 4 is a top elevational view of a pin assembly used on the table.
Figure 5:
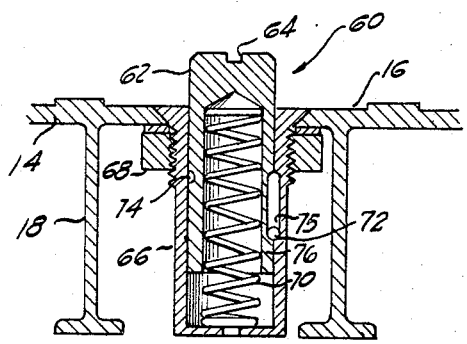
FIG. 5 is a sectional view of the pin assembly shown in FIG. 4.

Two pairs of retractable bayonet type miter pin assemblies 60 are provided for top section 14 on opposite sides of cutout portion 22 for use in miter cuts. Each pair of pin assemblies describes a line diverging at a 45° angle with respect to a line 61 described by blade 62 of saw 58 as it moves along cutout portion 20. As seen in FIGS. 4 and 5 the pin assemblies 60 each comprise a plunger 62 having a slot 64 in its top surface for receipt of a screwdriver or similar implement. The plunger is carried in a sleeve 66 which is secured to table 14 by a nut 68. A spring 70 normally biases the plunger upwardly. The sleeve 66 is provided with pin or stop means 72, as shown in FIGS. 4 and 5. The plunger 62 is provided with an annular groove 74 and an axially extending relieved portion 75, one end of which communicates with the annular groove 74, the opposite end terminating in a shoulder 76. Groove 74 and the relieved portion 75 cooperate with pin member 72 to provide for vertical adjustment of the plunger 62. In FIG. 5 there is shown a fragmentary view of the miter pin assembly with the plunger 62 in the extended position. To retract the plunger, it is merely pressed downward and rotated. During the downward movement the pin 72 traverses the length of the recess 75, coming into alignment with annular groove 74. Upon rotation of the plunger 62 the pin 72 enters the groove 74, thus locking the plunger in the retracted position.

To release the plungers 62 for enabling a miter cut, the plungers 62 are simply rotated to disengage pins 72 from the groove 74 and the springs 70 raise the plungers 62 above the surface 16. A lower shoulder 76 on axially extending recess portion 75 limits the upward movement of plungers 62. It will be appreciated that a wide variety of retractable plunger mechanisms may be employed.

An adjustable stop 77 which carries an extension scale 78 and slides between the T-shaped ribs 20 may be used to support long lengths of unmber and as a stop for cutting a number of pieces to a desired length without repeated measurement. The scale 78 is usually simply an extended portion of adjacent scale 42 and carried on stop 77 with its graduations increasing from left to right.

In addition another adjustable stop 79, which rides along either fence 32 or 34, is provided for easily controlling successive pieces to be cut to the same size. The stop 79 comprises a pair of legs 80 each having a lip which nests over the horizontal leg 39 of the fences and may be easily disengaged therefrom. A pivot pin extending between the legs 80 carries a cam actuated by lever 81 to cause the cam to lock the stop in a desired position.

To use the saw 58 on the table 10, the guide rail 46 is adjusted to receive the right side of the saw sole plate with the saw blade located on line 61 in alignment with the zero mark of the tapes 42 and perpendicular to the elongated axis of table 10. This line is actually about ⅝" from the right hand side of cutout portion 20 as seen in FIG. 1 and the adjacent zero portion of the tapes 42 are cut away as these are seldom used. The saw blade is conventionally positioned on the line 61 and rail 46 adjusted until it is suitably engaged with the adjacent side of the saw sole plate. The other rail 44 is then adjusted until it is engaged with the opposite side of the saw sole plate.

The blade of saw 58 extends just below the level of the upper work surface 16 into the cutout portion 20 to ensure the material is cut through completely and enables the chaff to fall free between ribs 20. The spacing between opposed faces of the vertical portion of the L-shaped guide rails 44 and 46 corresponds to the width of the sole plate of the saw 58 and may for example be between 5½" and 9" depending on the saw model. The saw 58 now rests on the rails 44 and 46 for sliding movement transverse to the longitudinal axis of the table. A board or siding, if arranged parallel to that axis is held manually against the fence and simply cut perpendicular to its axis. Power to the saw, of course, is usually provided over the saw's electrical cable 82.

Figure 3:
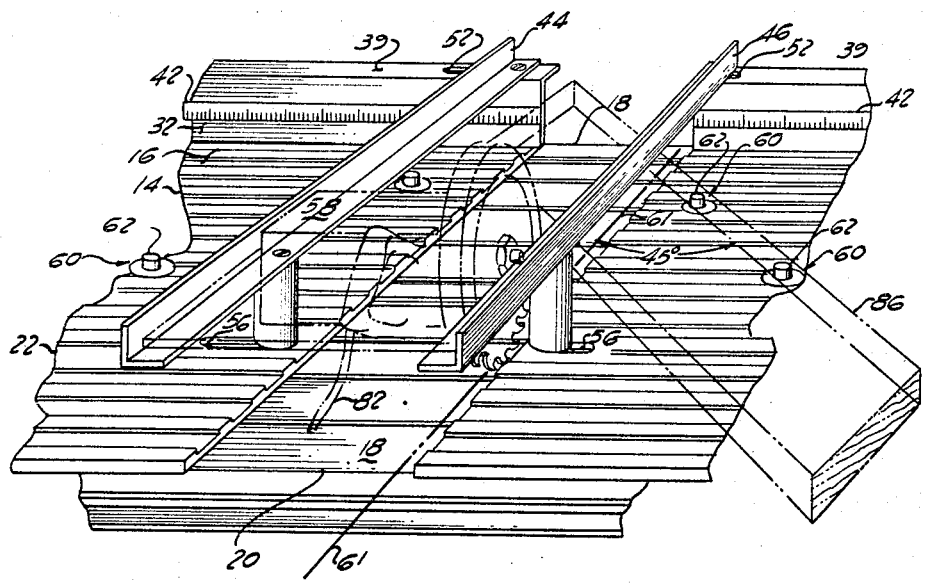
FIG. 3 is a fragmentary perspective view of the table and a saw thereon with a board or stud shown in position for a miter cut.

If a miter cut is to be made, the plungers 62 are raised, as explained, and the material such as 86 shown by broken lines in FIG. 3 is inserted beneath one of the rails 44 and 46 and manually held against the sides of plungers 62 at the desired side of the cutout portion 20 as shown in FIG. 3 for example. The saw is now moved forward to cut the materials 86 at an angle of 45°. The width which may be accommodated is dependent on the spacing between the plungers and the posts 48 and 50.

The apron 22 which holds the posts 48 and 50 effectively widens the table. This permits large widths of lumber to be received between the fences 32 and 34 and posts 48 and 50 without widening the table across its entire length. The recesses 40 in the fences enable the scales 42 to be easily removed or replaced and protect the scales from being cut, abraded or otherwise damaged. The scales 42 display increasing increments on opposite sides of the zero line along which the saw moves. This enables the lumber to be inserted from either end of the table and to be measured accordingly.

To use one of the adjustable stops 77 or 79, the stop is moved to the desired position and frictionally or otherwise fixed in position in any convenient manner. Thereafter the piece to be cut is butted against the stop. The tape 78 represents a continuation of the scale 42 in the adjacent fence so that the length of a stud laid against the stop 77 is easily measured. Conveniently positioned notches or marks in the fences provide easily visible positions to which the stop 79 may be moved when the pieces are to be cut to sizes which are often used at the sites.

The foregoing constitutes a description of an improved table for use with a portable saw whose inventive concepts are believed set forth in the accompanying claims.

What I claim is:

1. A portable table for use with a portable saw and adapted to support said saw for the controlled cutting of construction material placed thereon, said table comprising an extruded metal member having a planar top section and a plurality of spaced apart reinforcing ribs depending from the underside of said top section, support means mounted above the upper working surface of said table for operably receiving a portable saw for movement transverse to the length of the table, said planar top section being adapted to be recessed across its entire width in the area of said support means to provide a space for the reception of the saw blade during the cutting operation, a plurality of resiliently biased, optionally operable miter pins associated with said table and adapted to engage a piece of construction material and support said material at a predetermined angle with respect to the line of traverse of said saw blade, and means for selectively retaining said miter pins in either the retracted position, below the working surface of the table or in the extended position, above the working surface of the table.

2. A portable table as defined in claim 1 wherein the means to lock said miter pins in either the retracted or extended position comprises, an annular groove on the outer periphery of the pin member, a relieved portion associated with said groove and extending axially away from said groove and terminating in a shoulder, stop means associated with said table and received in said axially extending relieved portion and abutting said shoulder to limit the outward travel of said pin members and retain said pin members in the extended position, said stop member being registrable with said annular groove upon depression of said miter pin member, and engaged in said groove upon the subsequent rotation of said miter pin member relative to said stop member to effectively lock said miter pin member in the retracted position.

3. A retractable, resiliently biased miter pin assembly for attachment to a table comprising, an outer sleeve member, a plunger received in said outer sleeve member, means to resiliently bias said plunger to a position partially extended out of said sleeve member, and means for retaining said plunger in the extended position against the bias of said resilient means, while permitting said plunger to be locked in a retracted position relative to said sleeve, said means for retaining and locking said plunger including an annular groove on the outer periphery of the plunger member and a relieved portion associated therewith and extending axially away from said annular groove and terminating in a shoulder, stop means associated with said outer sleeve member and received in said axially extending relieved portion and abutting said shoulder to limit the outward travel of said plunger, said stop means being registrable with said annular groove upon depression of said plunger, and engageable in said groove upon the subsequent rotation of said plunger relative to said stop means and said sleeve member.

4. In combination with a table adapted to support a section of construction material for engagement by cutting means, a plurality of miter pin assemblies, each of which includes a plunger member and spring means adapted to bias said plunger member outwardly of said table to a position wherein a portion thereof extends above the working surface of said table and is thus adapted to engage construction material and support said material at a predetermined angle with respect to said cutting means, said miter pin assemblies further including means to limit the outward travel of said plunger member and permit said plunger member to be retracted to a position below the working surface of said table against the force exerted by said spring means and then locked in said retracted position.

5. The combination as defined in claim 4 wherein said means for limiting outward travel and permit locking of the plunger in the retracted position comprises an annular groove on the outer periphery of the plunger member, a relieved portion associated with said groove and extending axially away from said groove and terminating in a shoulder, stop means associated with said table and received in said axially extending relieved portion and adapted to abut said shoulder when the plunger is biased outwardly by the spring means to thereby retain said plunger in the extended position, said stop member being registrable with said annular groove upon depression of said plunger member and engageable in said groove upon the subsequent rotation of said plunger member relative to said stop member thereby effectively locking said plunger member in the retracted position.

References Cited
UNITED STATES PATENTS

| | | | |
|---|---|---|---|
| 2,624,471 | 1/1953 | Lunde | 287—103 |
| 2,682,899 | 7/1954 | Miller | 143—132 |
| 2,739,624 | 3/1956 | Haddock | 143—132 XR |
| 2,941,554 | 6/1960 | Long | 143—643 XR |
| 3,130,758 | 4/1964 | McKinley | 143—132 XR |
| 3,158,113 | 11/1964 | Johnson | 108—64 |
| 3,168,126 | 2/1965 | Konopka | 143—47 XR |

WILLIAM W. DYER, JR., *Primary Examiner.*

W. D. BRAY, *Assistant Examiner.*